P. KRIBS.
Cultivator.
No. 24,644.
Patented July 5. 1859.
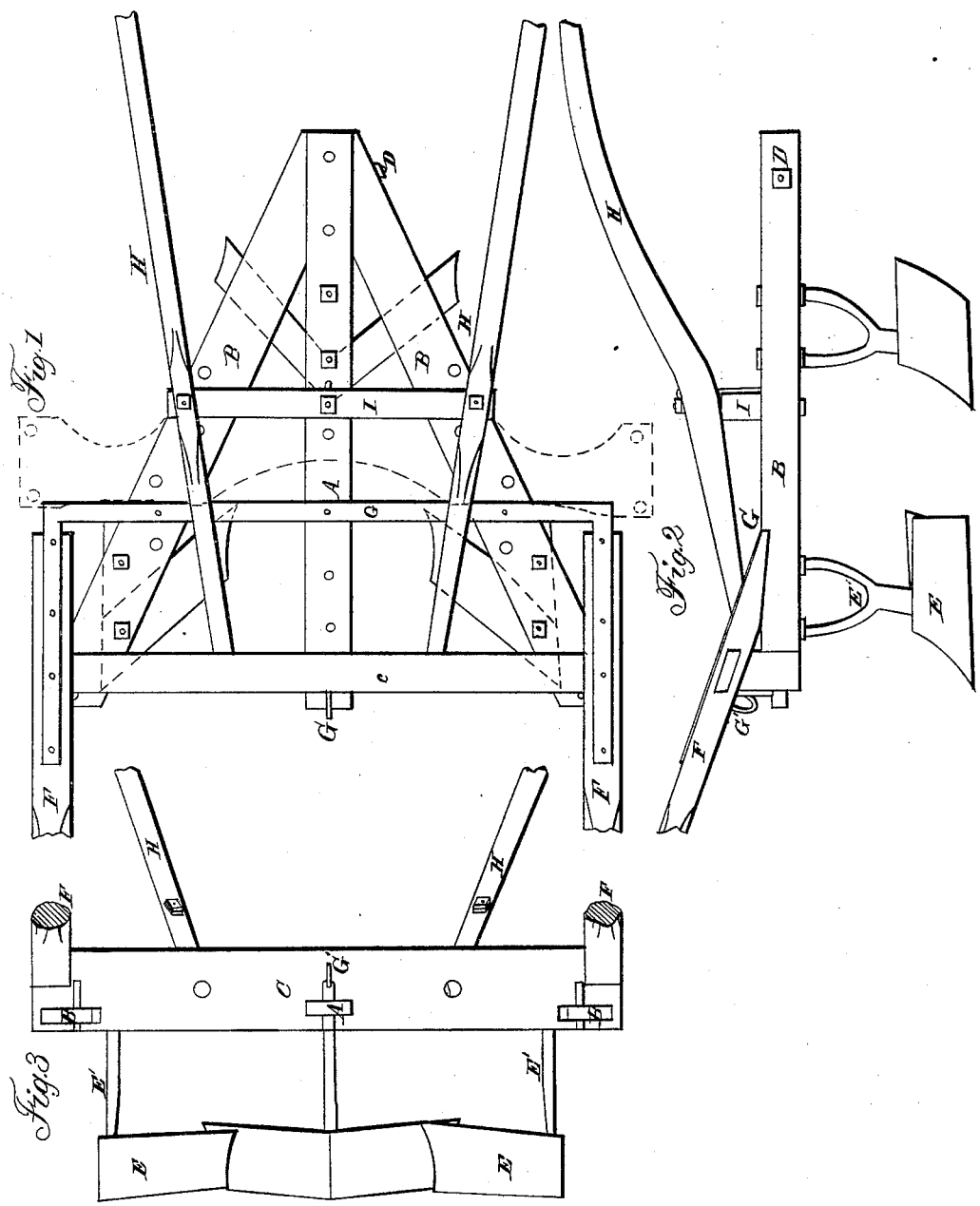
Witnesses:
Inventor:
Philip Kribs

UNITED STATES PATENT OFFICE.

PHILIP KRIBS, OF JEFFERSON FURNACE, PENNSYLVANIA.

IMPROVEMENT IN CULTIVATORS.

Specification forming part of Letters Patent No. 24,644, dated July 5, 1859.

*To all whom it may concern:*

Be it known that I, PHILIP KRIBS, of Jefferson Furnace, in the county of Clarion and State of Pennsylvania, have invented certain new and useful Improvements in Cultivators; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a plan or top view of my cultivator. Fig. 2 is an elevation of one side. Fig. 3 is an elevation of the forward end.

The nature of my invention and improvement in cultivators consists in the improvements described in the specification.

In the accompanying drawings, A is the center, and B B the side bars, which are framed into the front bar, C, and their rear ends are fastened together by the bolt D, the whole making a strong frame to which the other parts of the cultivator are fastened or connected, as shown in the drawings.

E E are the forward teeth, made of cast or wrought metal in the form shown in the drawings, and firmly fastened to the shanks E' E', which shanks have two arms or prongs provided with two screw-nuts to each prong, one screwing against the upper side and the other against the lower side of the bar B, so as to adjust both the length and the angle of the teeth below the bar and adapt the cultivator to the work being done. The center and rear tooth is made in the form shown in the drawings, and its shank is also provided with two prongs, like those described for the forward teeth, by which it may be adjusted in the center bar, A.

F F are portions of the shafts between which the horse or other animal is harnessed in some convenient manner to draw the cultivator. These shafts are formed onto the front bar, C, and stayed by the metal frame G, which is fastened to them and to the bars A and B B, as shown in Fig. 1 of the drawings.

G' is a staple or hook fastened in the front bar, C, to which the single-tree may be attached to draw the cultivator.

The forward ends of the handles H H are fastened in the front bar, C, and farther back they are fastened to the rear bar, I, by bolts which pass down through the bars B B, so as to hold the handles and bars firmly together; and the rear bar is also fastened to the bar A by a bolt. There is a series of holes in the bar A, by which the center tooth may be set either farther backward or forward, as may be desired; and there are also series of holes in the bars B B, by which the teeth E E may be set farther back and nearer together.

The teeth in the drawings are represented in a proper position for working young crops. The side teeth are arranged to turn the earth from the growing crops and stir it, while the rear tooth follows after and throws the loose earth into the furrows from whence it was taken. Thus by having the center tooth in rear of the side teeth the earth is stirred and pulverized and the furrows by the sides of the growing crops filled with earth again, which is pulverized and in fine order to absorb the dew and rain to nourish the crop. When the crop has grown so large as to require the earth to be thrown against it the tooth on the right side may be changed to the left and the one at the left changed to the right and the teeth set nearer together, so that the mold-boards will throw the earth against and around the stalks of the crops, and the ridge left in the middle of the row is divided by the center tooth, which is in the rear, and thrown against the bases of the furrows turned against the crops by the forward teeth, hence the advantage of having the side teeth in front of the center one instead of behind it, as heretofore.

When it is desirable to furrow land for planting the middle tooth may be removed and the mold-boards of the front teeth set to the outside, so as not to catch the clods between them, and if the outer holes in the frame will not make the furrows far enough apart a bar, J, may be fastened across the top of the frame, as shown by dotted lines in Fig. 1, and the two front teeth fastened in it, when it can be used for furrowing with great facility.

If it is desirable to plow in crops, a bar may be fastened across diagonally under the frame and three teeth set in it, with their mold-boards all in the same direction, so as to plow three furrows at once to work in grain crops.

I believe I have described and represented my improvements in cultivators so as to enable any person skilled in the art to make and use them.

I will now state what I desire to secure by Letters Patent:

The arrangement of the parts A B C, metal frame G, handles H, shanks E', teeth E, bar I, and shafts F, as described, for the purposes set forth.

In testimony whereof I have hereunto signed my name in the presence of two witnesses.

PHILIP KRIBS.

Witnesses:
J. DENNIS, Jr.,
J. F. CALLAN.